(12) United States Patent
San Roman Alerigi et al.

(10) Patent No.: US 12,559,366 B2
(45) Date of Patent: Feb. 24, 2026

(54) PHOTOCATALYTIC CONVERSION OF HYDROGEN SULFIDE TO HYDROGEN

(71) Applicant: SAUDI ARABIAN OIL COMPANY, Dhahran (SA)

(72) Inventors: Damian Pablo San Roman Alerigi, Al Khobar (SA); Adrian Cesar Cavazos Sepulveda, Nuevo Leon (MX); Sameeh Issa Batarseh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 516 days.

(21) Appl. No.: 18/193,183

(22) Filed: Mar. 30, 2023

(65) Prior Publication Data

US 2024/0327211 A1 Oct. 3, 2024

(51) Int. Cl.
C01B 3/06 (2006.01)
C01B 3/50 (2006.01)
C01B 17/04 (2006.01)

(52) U.S. Cl.
CPC .................. C01B 3/06 (2013.01); C01B 3/50 (2013.01); C01B 17/0426 (2013.01); C01B 2203/1205 (2013.01)

(58) Field of Classification Search
None
See application file for complete search history.

(56) References Cited

U.S. PATENT DOCUMENTS 3,962,409 A * 6/1976 Kotera ................ C01B 17/0495
423/571
4,526,774 A 7/1985 Maas, Jr. et al.
(Continued)

FOREIGN PATENT DOCUMENTS

CN 101590410 B 11/2012
FR 3009427 A1 2/2015
(Continued)

OTHER PUBLICATIONS

Oladipo, Habeebllah, et al., "Overview and challenges of the photolytic and photocatalytic splitting of H2S", Catalysis Today, ScienceDirect, Elsevier B.V., vol. 380, Mar. 2021, pp. 125-137 (13 pages).

(Continued)

*Primary Examiner* — John J Figueroa
(74) *Attorney, Agent, or Firm* — Osha Bergman Watanabe & Burton LLP

(57) ABSTRACT

A system for photocatalytic conversion includes a flowline, in which a production flow travels in a flow direction; and a reactor module. The reactor module includes a waveguide; a photocatalyst coupled to the waveguide, configured to convert hydrogen sulfide in the production flow to hydrogen and sulfur; a heater configured to heat a bottom of the reactor module, such that the sulfur is in liquid phase; and a sulfur collector configured to collect the sulfur. A method for photocatalytic conversion includes introducing a production flow from a flowline to a reactor module, the production flow including hydrogen sulfide and traveling in a flow direction; directing a light from a light source to a photocatalyst through a waveguide; converting the hydrogen sulfide into hydrogen and sulfur using the photocatalyst; and heating a portion of the reactor module to an elevated temperature, the sulfur in a liquid phase under the elevated temperature.

17 Claims, 5 Drawing Sheets

(56) References Cited

U.S. PATENT DOCUMENTS

| | | | |
|---|---|---|---|
| 6,017,425 A | 1/2000 | Park et al. | |
| 6,108,476 A | 8/2000 | Iimura | |
| 6,248,218 B1 | 6/2001 | Linkous et al. | |
| 6,572,829 B2 | 6/2003 | Linkous et al. | |
| 7,220,391 B1 | 5/2007 | Huang et al. | |
| 7,578,985 B2* | 8/2009 | Aderhold, Jr. | B01D 53/8612 |
| | | | 423/210 |
| 7,985,397 B2 | 7/2011 | Matsumoto et al. | |
| 10,300,454 B2 | 5/2019 | Jaffrey | |
| 10,358,349 B1* | 7/2019 | Alshahrani | C01B 17/0404 |
| 11,530,131 B1* | 12/2022 | Tora | C01B 17/0434 |
| 2011/0118105 A1* | 5/2011 | Schwank | B01J 38/12 |
| | | | 429/479 |
| 2013/0177496 A1* | 7/2013 | Umino | C01B 17/32 |
| | | | 422/198 |
| 2020/0207622 A1* | 7/2020 | Lofberg | B01D 53/8612 |
| 2021/0189573 A1 | 6/2021 | Karakaya | |
| 2023/0139298 A1* | 5/2023 | O'Connell | B01J 19/245 |
| | | | 423/576 |
| 2023/0242825 A1* | 8/2023 | Wildfire | B01J 8/1818 |
| | | | 423/651 |

FOREIGN PATENT DOCUMENTS

| | | |
|---|---|---|
| JP | 2005-350293 A | 12/2005 |
| JP | 2010-090466 A | 4/2010 |
| WO | 02/083308 A1 | 10/2002 |

OTHER PUBLICATIONS

International Search Report issued for corresponding international patent application No. PCT/US2024/021638, mailed Jun. 27, 2024 (6 pages).

Written Opinion issued for corresponding international patent application No. PCT/US2024/021638, mailed Jun. 27, 2024 (7 pages).

* cited by examiner

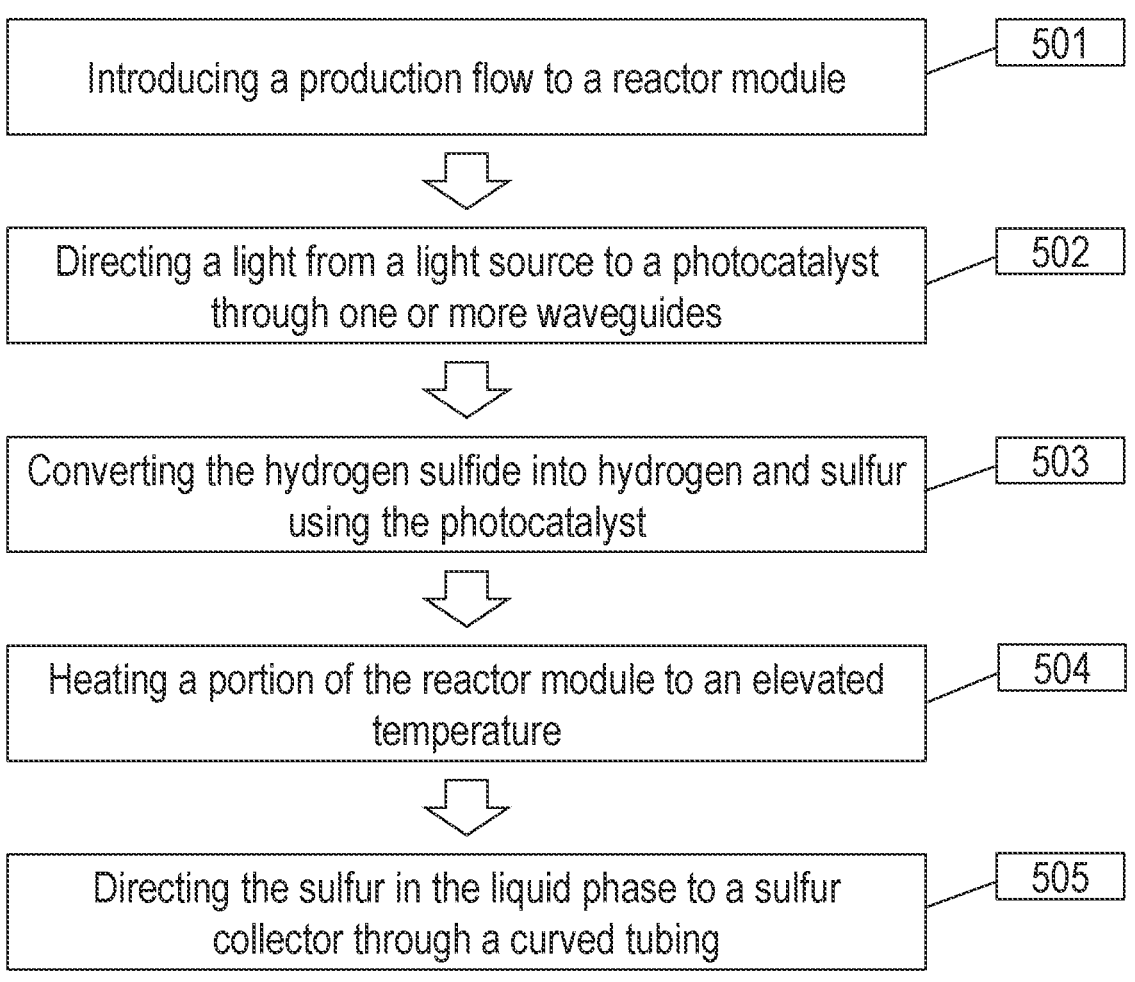

Introducing a production flow to a reactor module — 501

Directing a light from a light source to a photocatalyst through one or more waveguides — 502

Converting the hydrogen sulfide into hydrogen and sulfur using the photocatalyst — 503

Heating a portion of the reactor module to an elevated temperature — 504

Directing the sulfur in the liquid phase to a sulfur collector through a curved tubing — 505

FIG. 5

PHOTOCATALYTIC CONVERSION OF HYDROGEN SULFIDE TO HYDROGEN

BACKGROUND

Hydrogen sulfide ($H_2S$) may be a hazardous component in oil and gas upstream production, where $H_2S$ is naturally generated in situ from reservoir biomass and from sulfate-containing minerals through microbial sulfate reduction and/or thermochemical sulfate reduction. The technologies employed in oil and gas production may also contribute to generation or delay of appearance of $H_2S$. For example, steam-assisted gravity drainage and hydraulic fracturing used in production of oil sands and shale oil/gas, respectively, can potentially convert the sulfur content in the oil and gas into hydrogen sulfide or contribute excess amounts of hydrogen sulfide during production.

Hydrogen sulfide detection and removal techniques may be implemented in oilfield applications so as to preserve the environment, protect workers, avoid corrosion and bad smells, and protect refined products and physical assets. Even crude oil that has already been treated might produce more hydrogen sulfide, because sulfate-reducing bacteria may continue to digest the oil. As such, treatment of hydrogen sulfide is needed across different stages of a production line.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for photocatalytic conversion comprising: a flowline, in which a production flow travels in a flow direction; and a reactor module. The reactor module comprises: a waveguide; a photocatalyst coupled to the waveguide, configured to convert hydrogen sulfide in the production flow to hydrogen and sulfur; a heater configured to heat a bottom of the reactor module, such that the sulfur is in liquid phase; and a sulfur collector configured to collect the sulfur.

In one or more embodiments, the system further comprises a light source configured to generate a light directed to the photocatalyst through the waveguide.

In one or more embodiments, the system further comprises a tubing configured to guide the sulfur to the sulfur collector, wherein at least a portion of the tubing is curved.

In one or more embodiments, the system further comprises a valve disposed at an uppermost point of the portion of the tubing that is curved.

In one or more embodiments, the system further comprises one or more of a first outlet for the hydrogen, a second outlet for the sulfur, and a third outlet for a residue of the production flow.

In one or more embodiments, the system further comprises a permeation filter configured to allow selective permeation of the hydrogen.

In one or more embodiments, the system further comprises a filter configured to remove unreacted hydrogen sulfide. In one or more embodiments, the filter comprises porous silicon carbide doped with aluminum or copper.

In one or more embodiments, the photocatalyst is in form of nanoparticles and is embedded in a cladding of the waveguide.

In one or more embodiments, the photocatalyst is in form of a thin film and is coated on an outer surface of the waveguide.

In another aspect, embodiments disclosed herein relate to a method for photocatalytic conversion, comprising: introducing a production flow from a flowline to a reactor module, wherein the production flow includes hydrogen sulfide and travels in the flowline in a flow direction; directing a light from a light source to a photocatalyst through a waveguide; converting the hydrogen sulfide into hydrogen and sulfur using the photocatalyst; and heating a portion of the reactor module to an elevated temperature, wherein the sulfur is in a liquid phase under the elevated temperature.

In one or more embodiments, the method further comprises directing the sulfur in the liquid phase to a sulfur collector through a tubing having a curved portion.

In one or more embodiments, the method further comprises controlling a valve disposed at an uppermost point of the curved portion of the tubing.

In one or more embodiments, the method further comprises directing the hydrogen to a hydrogen collector.

In one or more embodiments, the method further comprises filtering unreacted hydrogen sulfide before the directing the hydrogen to the hydrogen collector.

In one or more embodiments, the method further comprises allowing selective permeation of the hydrogen before the directing the hydrogen to the hydrogen collector.

In one or more embodiments, the method further comprises directing a residue of the production flow to a gas-oil separation plant.

Other aspects and advantages of the claimed subject matter will be apparent from the following description and the appended claims.

BRIEF DESCRIPTION OF DRAWINGS

FIG. 5 shows a photocatalytic conversion method according to one or more embodiments.

DETAILED DESCRIPTION

Figure 1:
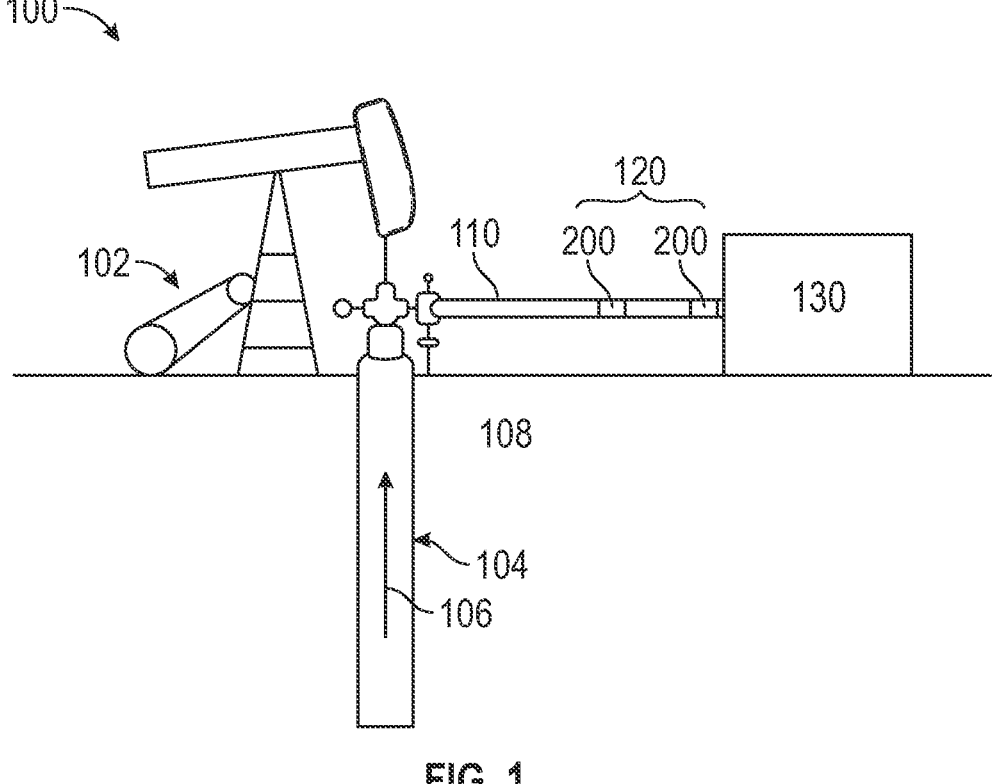
FIG. 1 shows an oil and gas production facility including a photocatalytic conversion system according to one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In one aspect, embodiments disclosed herein relate to systems and methods for photocatalytic conversion of hydrogen sulfide (H$_2$S) to hydrogen (H$_2$) and sulfur (S) using a waveguide coupled with a photocatalyst to recover hydrogen from a hydrocarbon flow from oil and gas production. The photocatalytic conversion systems and the methods disclosed herein provide an effective and efficient way to split H$_2$S under room pressure, unlike conventional art where high temperature is usually needed.

In one or more embodiments, the photocatalytic conversion system includes a light source. The light source may be a single wavelength light source configured to illuminate a light having a single wavelength, or a multiple wavelength light source configured to illuminate a light having a plurality of wavelengths. In one or more embodiments, the light source illuminates a light at any band of interest, for example, an ultraviolet (UV) light or a visible light. In one or more embodiments, the light source illuminates a light with a frequency above a bandgap of the photocatalyst to be used in the photocatalytic conversion. Non-limiting examples of the light source may include a narrow-band light source, for example, a laser or a super-luminescent diode (SLED).

In one or more embodiments, the photocatalytic conversion system includes a waveguide. The waveguide is a structure that restrict a spatial region in which a light can propagate, for example, along its longitudinal direction. The waveguide is configured to illuminate an interior volume of the reactor module entirely and consistently, thus providing the energy required to activate the photocatalytic conversion of hydrogen sulfide. The waveguide may be made of a suitable material that is known to the art, for example, glass, polymer, or semiconductor. In one or more embodiments, the waveguide includes a longitudinally extended high-index optical medium, referred to as a core, which is transversely surrounded by a low-index media, referred to as a cladding. Various waveguide configurations may be used to facilitate light extraction to the environment (e.g., an interior of the reactor module) or coupling to a cladding (e.g., a leaky mode optical fiber). In one or more embodiments, the waveguides includes a few-mode or a single-mode optical fiber with a porous cladding. In one or more embodiments, the waveguide includes a multimode fiber where the cladding's refractive index is similar to the core. In one or more embodiments, the waveguide includes a graded-index fiber with a radial distribution of doping. In one or more embodiments, the waveguide includes a hollow core fiber with built-in asymmetry. In one or more embodiments, the waveguide includes a waveguide rod with a roughened surface. A diameter of the waveguide rod may be at least 1 millimeter (mm). In one or more embodiments, the waveguide may comprise a coating layer of carbon, silicon-carbide, or sol gel buffer, where a thickness of the coating layer is no more than 100 nanometers (nm). It will be understood that the photocatalytic conversion system may include one or more waveguide.

In one or more embodiments, the photocatalytic conversion system includes a photocatalyst configured to catalyze the conversion of hydrogen sulfide to hydrogen and sulfur. The photocatalyst may include a semiconductor with low photocorrosion, for example, a metal oxide or a metal sulfide. The photocatalyst may be in forms of quantum dots, quantum dashes, nanoparticles, or thin films. In one or more embodiments, the photocatalyst includes one or more of MnS, CdS, ZnS, CeS, ZrS$_2$, TiO$_2$, ZrO$_2$, BaZrS$_3$, SrTiO, SiC, and N-doped TiO$_2$. The photocatalyst may include a promoter. The promoter may be a metal, and may include one or more of Al, Ti, Ta, Ni, Fe, and Co.

According to one or more embodiments, a part of the waveguide may be made of a material that also serves as the photocatalyst. That is, the photocatalyst may be integrally incorporated to the waveguide. In one or more embodiments, the waveguide may be partially or fully made of the photocatalyst that is a chalcogenide semiconductor material (e.g., cadmium sulfide, cadmium telluride, zinc sulfide, arsenic sulfide) doped with a promoter. In one or more embodiments, the waveguide may be a hollow core waveguide, in which the photocatalyst is used as the material of high refractive index in the hollow core waveguide, and the gas flows through the hollow core. In one or more embodiments, the waveguide may be a graded-index fiber with a radial distribution of doping of the photocatalyst.

According to one or more embodiments, the waveguide and the photocatalyst may be coupled to each other, such that the photocatalyst is in close vicinity of the waveguide, more specifically, of the light guided by the waveguide. In one or more embodiments, the photocatalyst, in form or nanoparticles, may be embedded in a cladding (e.g., a porous cladding) of the waveguide. In one or more embodiments, the photocatalyst, in form of a thin film, may be deposited to an outer surface of the waveguide. In one or more embodiments, the photocatalyst may be disposed in a volume between waveguides, for example, within a matrix of aerogel or a porous polymer that serves as a support of the photocatalyst.

In one or more embodiments, the photocatalytic conversion system includes a hydrogen collector. The hydrogen generated form the photocatalytic conversion may exit the reactor module through the hydrogen outlet into the hydrogen collector. The hydrogen collector may be a tank, or a material that captures and stores hydrogen, such as metal organic frameworks (MOFs).

In one or more embodiments, the photocatalytic conversion system includes a sulfur collector. Sulfur is generated from the photocatalytic conversion of hydrogen sulfide and may precipitate to a bottom of the reactor module. To prevent sulfur buildup, a heater may be used to heat the bottom of the reactor module such that the precipitated sulfur is in liquid phase. In one or more embodiments, the heater may be configured to heat the bottom of the reactor module to an elevated temperature of at least 120° C. The sulfur collector may include an S-shaped or serpentine tubing and a tank. The tubing is configured to guide the sulfur in liquid phase from the sulfur outlet of the reactor module to the tank. At least a portion of the tubing is curved, and a valve may be arranged at an uppermost point of the curved portion of the tubing. The valve is controlled to open only when a pressure at the valve is larger than a pressure in the reactor module. As a result, the valve ensures that the sulfur in liquid phase may exit to the sulfur collect and the hydrocarbons may not escape.

In one or more embodiments, the photocatalytic conversion system includes one or more filters. The filter may be configured to further remove unreacted sulfur sulfide or configured to allow selective permeation of hydrogen. The filter may be disposed at an outlet of the reactor module. In one or more embodiments, the filter may be disposed at the hydrogen outlet, at the GOSP outlet, or both. In one or more embodiments, the filter may be disposed in the flowline at an exit end of each reactor module along the flow direction. The filter may be made of a suitable material that is known in the art, for example, a porous silicon carbide doped with aluminum or copper to further remove unreacted sulfur sulfide.

In one or more embodiments, the photocatalytic conversion system includes one or more sensors, configured to analyze backscattered and transmitted light in each wave-guide. The analysis of the light intensity may provide information about a health of the waveguide and the photocatalytic conversion process. In one or more embodiments, the waveguide may serve as the sensor, where an attenuated reflection of the light may be used to determine a concentration of evolved substances during the photocatalytic conversion process. The attenuated reflection of the light may be measured by a spectroscopy, for example a Fourier transform spectrometer or a dual comb spectrometer, providing fingerprint characterizations of the evolved substances. The sensor data and spectroscopic data may be used in determining one or more parameters in the photocatalytic conversion system, for example, precise control of valves, determination of photocatalyst concentration and light power.

According to one or more embodiments, the photocatalytic conversion system includes a control unit to control one or more parameters in the system and to obtain, process, and transfer any data associated with the system. For example, the control unit may include a computing device, providing computational functionalities associated with algorithms, methods, functions, processes, flows, and procedures as described in one or more embodiments of the present disclosure.

According to one or more embodiments, the computing device is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computing device may include a computer that includes an input device, such as a keypad, keyboard, touch screen, or other device that can accept user information, and an output device that conveys information associated with the operation of the computing device, including digital data, visual, or audio information (or a combination of information), or a GUI.

At a high level, the computing device is an electronic computing device operable to receive, transmit, process, store, or manage data and information associated with the described subject matter. According to some implementations, the computing device may also include or be communicably coupled with an application server, e-mail server, web server, caching server, streaming data server, business intelligence (BI) server, or other server (or a combination of servers). In one or more embodiments, the computing device includes at least one processor. Generally, the processor executes instructions and manipulates data to perform the operations of the computing device and any algorithms, methods, functions, processes, flows, and procedures as described in the instant disclosure. In one or more embodiments, the computing device includes a memory that holds data for the computing device. For example, the memory can be a database storing data consistent with this disclosure. In one or more embodiments, the computing device includes an application, which is an algorithmic software engine providing functionality according to particular needs, desires, or particular implementations of the computing device, particularly with respect to functionality described in the present disclosure.

One or more embodiments of the present disclosure will be described in figures. Like elements in the various figures are denoted by like reference numerals for consistency.

As shown in FIG. 1, an oil and gas production facility 100 may include a rig 102 and a wellbore 104, in which hydrocarbons 106 are extracted from formation 108. A production flow containing the hydrocarbons may be pumped upstream to the rig on the surface and subsequently guided to a gas-oil separation plant (GOSP) 130 through a flowline 110 for separation and further processing. The production flow may contain gases, liquids, and solids, and may contain at least hydrocarbons and hydrogen sulfide. A system for photocatalytic conversion of hydrogen sulfide to hydrogen may be disposed at any location between the wellbore and the GOSP. In the non-limiting example of FIG. 1, the photocatalytic conversion system 120 including one or more reactor modules 200 and at least a portion of the flowline 110.

Figure 2:
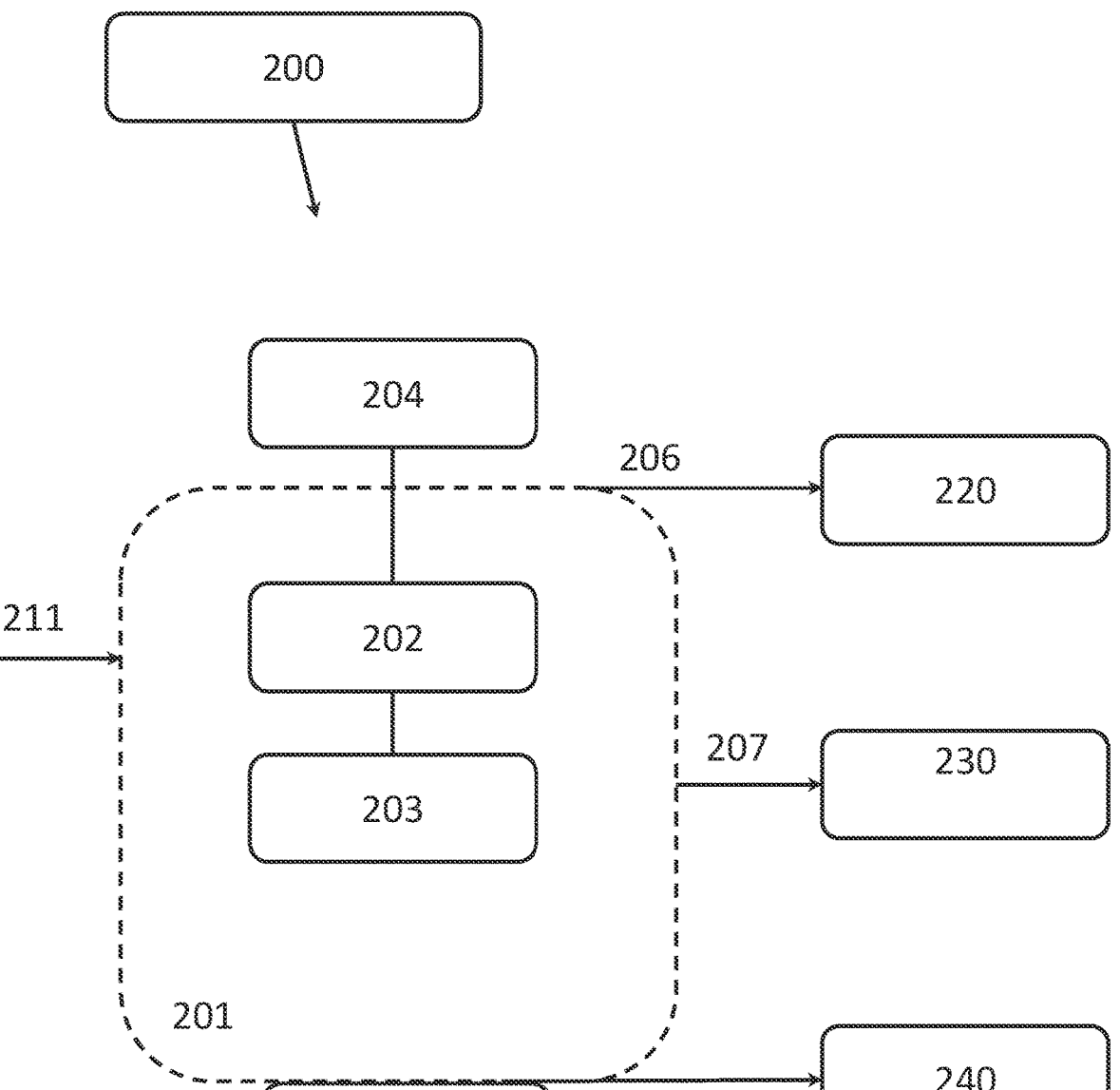
FIG. 2 shows a reactor module according to one or more embodiments.

According to one or more embodiments, the photocatalytic conversion system 120 includes one or more of reactor modules 200. Although two reactor modules are shown in FIG. 1, it is recognized to one having ordinary skill in the art that the number of reactor modules is non-limiting and may be added or modified as needed. Each reactor module may have a configuration as shown in FIG. 2. Each reactor module 200 may comprise a casing 201 (dashed line), having one or more walls confining a space for photocatalytic conversion reactions. In one or more embodiments, the flowline serves as the casing. Alternatively, the flowline may be connected to an inlet of the casing. One or more waveguides 202 and a photocatalyst 203 may be disposed inside the casing 201. A light source 204 may be used as a source of illumination and generates a light to be guided to the waveguides 202. A production flow 211 is introduced to enter the reactor module 200 and travels through the waveguides 202. The reactor module 200 includes one or more outlets, for example, a hydrogen outlet 206 where the hydrogen gas generated from reactions in the reactor module is guide to a hydrogen collector 220; a GOSP outlet 207 where the remaining components (or residue) of the production flow are guided to the GOSP 230 for separation, analysis, and further processing; and a sulfur outlet 208 where sulfur generated from reactions in the reactor module is guided to a sulfur collector 240. In one or more embodiments, the hydrogen outlet and the GOSP outlet may be combined, and the hydrogen generated from the photocatalytic conversion may be separated at the GOSP. The reactor module 200 includes a heater 209. The heater 209 may be disposed near or at a bottom of the reactor module configured to heat the bottom of the reactor module, such that the sulfur generated from the photocatalytic conversion is in liquid phase at an elevated temperature and is guided to the sulfur collector 240 in a liquid phase. The photocatalytic conversion system may further include a control unit (not shown) to control one or more parameters in the system and to obtain, process, and transfer any data associated with the system.

Figure 3A:
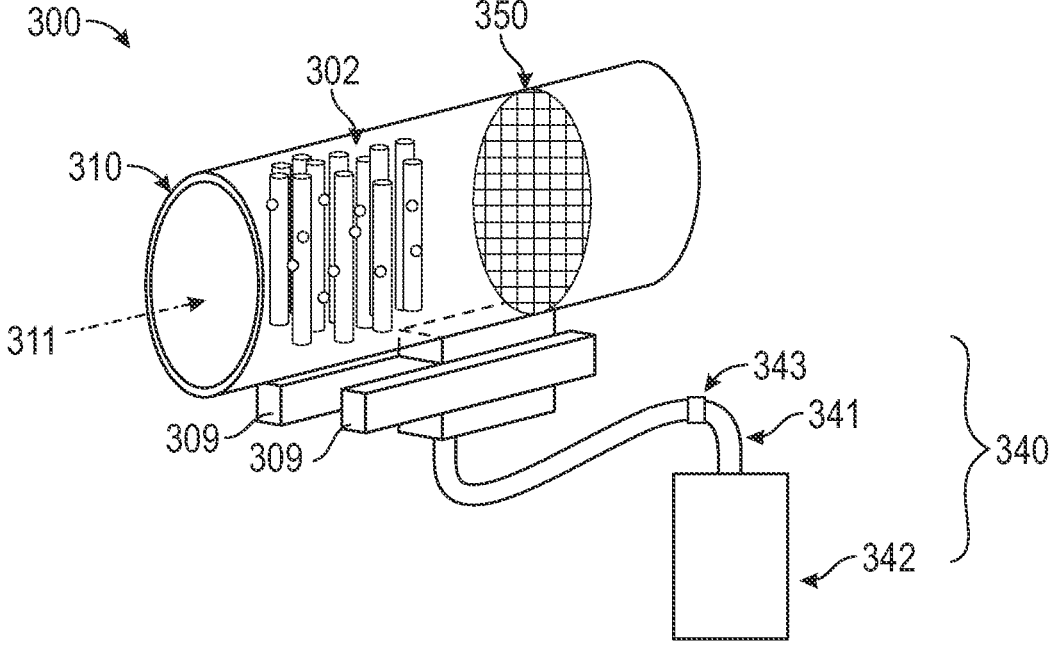
FIG. 3A shows a reactor module according to one or more embodiments.

According to one or more embodiments, the photocatalytic conversion system described herein may be incorporated in the flowline. The photocatalytic conversion system may include one or more reactor modules distributed along the flowline from a wellbore to a GOSP. The reactor modules may be retrievable or permanently incorporated to the flowline. The one or more reactor modules may be arranged in series, parallel, or both. A number of the reactor modules may be modified as needed. FIG. 3A shows a specific example of a reactor module in accordance with one or more embodiments of the present disclosure.

As shown in FIG. 3A, at least a portion of the reaction module 300 is disposed inside the flowline. A production flow 311 in the flowline 310 travels in a flow direction and passes through the reactor module. A plurality of waveguides 302 may be disposed in the reactor module and may be disposed along a direction that is perpendicular to the flow direction. A photocatalyst may be coupled to the waveguides 302 to convert hydrogen sulfide in the production flow into elemental hydrogen and sulfur. In one or more embodiments, the hydrogen generated from the photocatalytic conversion may remain in the flow to be separated at the GOSP. Alternatively, the hydrogen may be captured by a hydrogen collector, such as metal organic frameworks (MOFs). The sulfur generated from the photocatalytic conversion is collected by a sulfur collector 340. One or more heaters 309 may be disposed below each reactor module to maintain an elevated temperature of at least 120° C. to keep the sulfur at a bottom of the flowline in liquid phase. The sulfur in liquid phase exits the flowline through an S-shaped tubing 341 to a tank 342 of the sulfur collector. The tubing 341 is disposed below the flowline and has a curved portion. A valve 343 is arranged at an uppermost point of the curved portion and only opens when a pressure at the valve is larger than a pressure in the flowline. A filter 350 made of porous silicon carbide doped with aluminum or copper may be placed at an exit end of the reactor module along the flow direction as additional filtering of hydrogen sulfide.

Figure 3B:
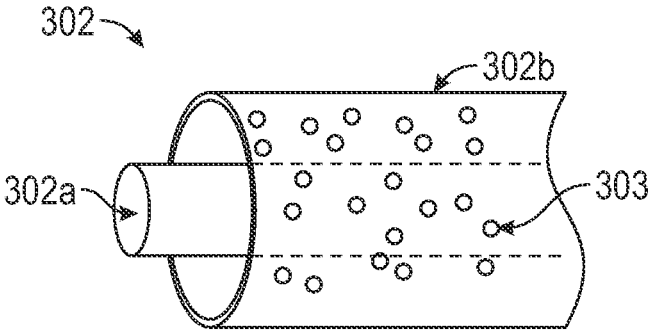
FIG. 3B shows a configuration of waveguide and photocatalyst according to one or more embodiments.

Each reactor module may include an array of waveguides and a photocatalyst coupled to the waveguides. FIG. 3B shows a configuration of the waveguides and the photocatalyst in accordance with one or more embodiments of the present disclosure. Each waveguide 302 includes a core 302*a* in rod shape and a cladding 302*b* made of a porous material. In one or more embodiments, the porous material may be an aerogel or a porous polymer. The photocatalyst 303 is doped to the porous cladding 302*b* of the waveguide. A narrow band light from a light source propagates through the core 302*a*. An outer surface of the core may be roughened such that light can scatter out of the core 302*a* and propagate to the cladding 302*b*. The scattered light, which has a frequency higher than a bandgap of the photocatalyst 303, drives the photocatalytic conversion of hydrogen sulfide. Although FIG. 3B only shows one example of waveguide and photocatalyst, it is recognized to one having ordinary skill in the art that the waveguide and photocatalyst may have configurations described in one or more embodiments of the present disclosure.

Figure 4:
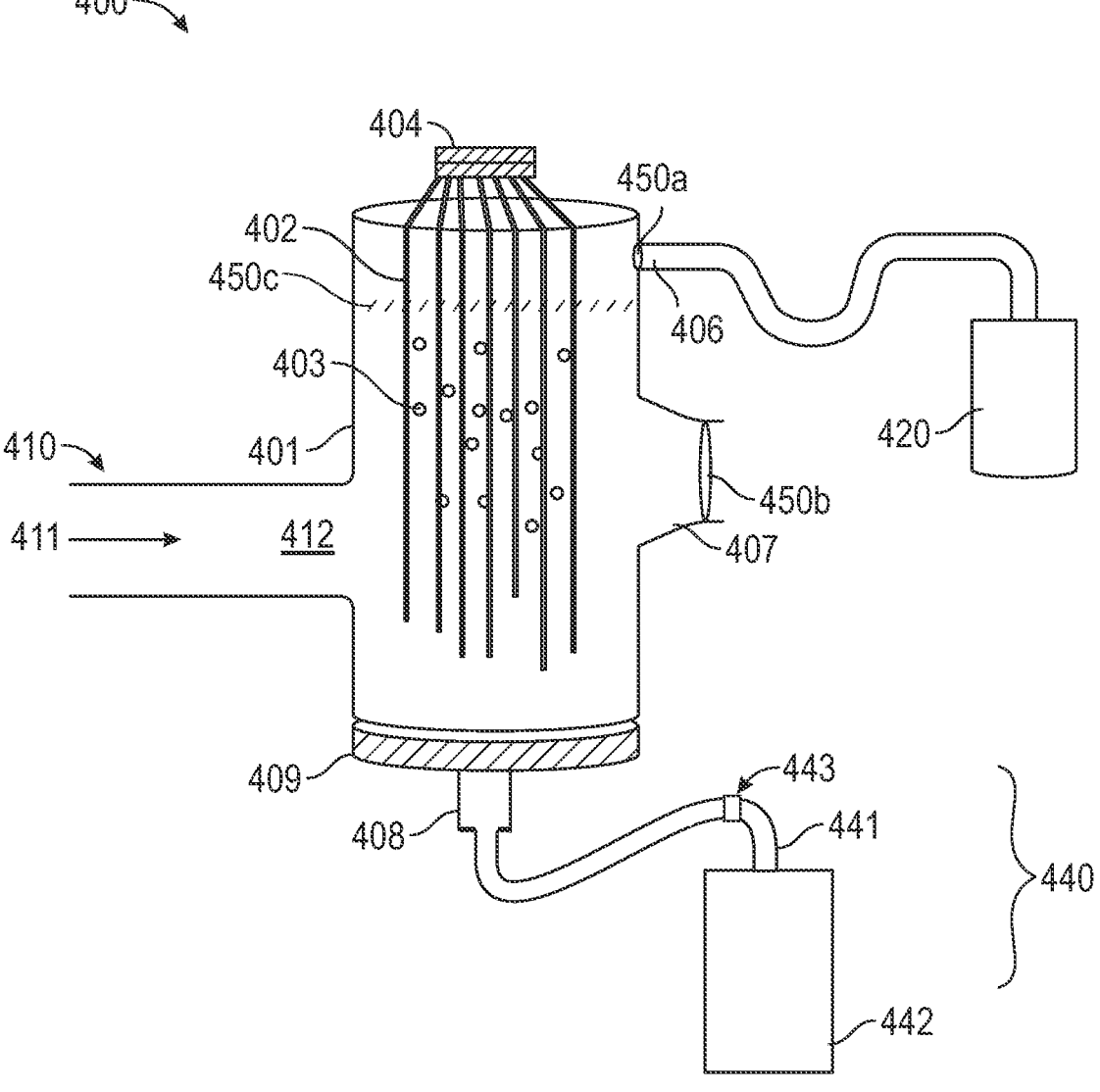
FIG. 4 shows a reactor module according to one or more embodiments.

FIG. 4 shows another example of a reactor module in accordance with one or more embodiments of the present disclosure. Instead of disposing a portion of the reactor module inside the flowline, FIG. 4 shows a reactor module 400 that is incorporated to the flowline 410, where the flowline is connected to an inlet 412 of a production flow 411. The production flow 411 in the flowline 410 travels in a flow direction and enters the reactor module 400. The reactor module may be disposed at an end of the flowline and right ahead of a GOSP. The reactor module comprises a casing 401, made of metal, or metal alloy, or any other material as needed. A plurality of waveguides 402 are disposed inside the casing 401, along a direction perpendicular to the flowline (or the flow direction). A photocatalyst 403 may be coupled to the waveguides 402, in a configuration according to one or more embodiments of the present disclosure. A light source 404, such as a laser or a SLED, is configured to generate a narrow band light that propagates through the waveguides 402 to the photocatalyst 403 to drive photocatalytic conversion of hydrogen sulfide. The reactor module has a plurality of outlets. For example, a hydrogen outlet 406 is arranged at a top portion of the casing, such that the hydrogen exits the casing and is collected by a hydrogen collector 420. The reactor module includes a sulfur outlet 408 at a bottom of the casing, where the sulfur generated from the photocatalytic conversion exits to a sulfur collector 440. A heater 409 may be used to maintain an elevated temperature of at least 120° C. to keep the sulfur precipitated to the bottom of the casing in liquid phase. The sulfur in liquid phase exits the casing through an S-shaped tubing 441 to a tank 442 of the sulfur collector 440. The tubing 441 is disposed below the casing and has a curved portion. A valve 443 is arranged at an uppermost point of the curved portion of the tubing 441 and only opens when a pressure at the valve is larger than a pressure in the flowline. The residue of the production flow after removing hydrogen sulfide exits the casing through a GOSP outlet 407 and is directed to the GOSP for separation, analysis, and further processing. The reactor module may include one or more filters. In one or more embodiments, a filter 450*a* made of porous silicon carbide doped with aluminum or copper may be placed at the hydrogen outlet of the reactor module as additional filtering of hydrogen sulfide to prevent unreacted hydrogen sulfide from entering the hydrogen collector. In one or more embodiments, a filter 450*b* made of porous silicon carbide doped with aluminum or copper may be placed at the GOSP outlet as additional filtering of hydrogen sulfide. In one or more embodiments, a filter 450*c* that allows selective permeation of hydrogen may be disposed on a plane that is perpendicular to the waveguides and lower than the hydrogen outlet 406, such that only hydrogen may permeate the filter and exits the casing through the hydrogen outlet.

In one or more embodiments, one or more reactor modules as shown in FIG. 3A may be disposed in the flowline prior to one or more reactor modules as shown in FIG. 4.

Embodiments disclosed herein may also relate to methods for photocatalytic conversion of hydrogen sulfide, associated with the photocatalytic conversion system described in the present disclosure. For example, FIG. 5 shows a method in accordance with one or more embodiments.

In one or more embodiments, the method includes step 501, introducing a production flow from a flowline to a reactor module in a photocatalytic conversion system. The production flow includes at least hydrocarbons and hydrogen sulfide, and travels in the flowline in a flow direction.

In one or more embodiments, the method includes step 502, directing a light from a light source to a photocatalyst through one or more waveguides. The waveguides and the photocatalyst may be coupled to each other in accordance with one or more embodiments described in the present disclosure.

In one or more embodiments, the method includes step 503, converting the hydrogen sulfide into hydrogen and sulfur using the photocatalyst.

In one or more embodiments, the method includes step 504, heating a portion of the reactor module to an elevated temperature, such that the sulfur is in a liquid phase.

In one or more embodiments, the method includes step 505, directing the sulfur in the liquid phase to a sulfur collector through a curved tubing.

In one or more embodiments, the method may further include controlling a valve disposed at an uppermost point of a curved portion of the tubing to avoid escape of hydrocarbons. The controlling may be based on a sensor data obtained from one or more sensors in the photocatalytic conversion system. For example, the sensor may be a pressure sensor, and the valve is controlled to open if a pressure at the valve is greater than a pressure in the reactor module.

In one or more embodiments, the method further includes directing the hydrogen to a hydrogen collector. This directing process may include filtering unreacted hydrogen sulfide or allowing selective permeation of the hydrogen. A filter described in one or more embodiments of the present disclosure may be used for the filtering and selective permeation.

In one or more embodiments, the method may further include directing a residue of the production flow to a GOSP. This directing process may include filtering unreacted hydrogen sulfide, using a filter described in one or more embodiments of the present disclosure.

The systems and methods for photocatalytic conversion of hydrogen sulfide provide an efficient and effective technology to recover hydrogen from hydrocarbon flows from oil and gas production. The recovered elements may be further processed for energy and industrial use. By incorporating the photocatalytic conversion systems directly to the flowline, a time of recovery may be reduced, and a production of hydrocarbons may be improved. Although one or more embodiments of the present disclosure relates to photocatalytic conversion of hydrogen sulfide, the technique may be expanded to treatment of other gases/liquids flows, for example, a sewage.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system for photocatalytic conversion, comprising:
a flowline, in which a production flow travels in a flow direction; and
a reactor module,
wherein the reactor module comprises:
    a waveguide;
    a photocatalyst coupled to the waveguide, configured to convert hydrogen sulfide in the production flow to hydrogen and sulfur;
    a heater configured to heat a bottom of the reactor module, such that the sulfur is in liquid phase; and
    a sulfur collector configured to collect the sulfur.

2. The system of claim 1, further comprising a light source configured to generate a light directed to the photocatalyst through the waveguide.

3. The system of claim 1, further comprising a tubing configured to guide the sulfur to the sulfur collector, wherein at least a portion of the tubing is curved.

4. The system of claim 3, further comprising a valve disposed at an uppermost point of the portion of the tubing that is curved.

5. The system of claim 1, further comprising one or more of a first outlet for the hydrogen, a second outlet for the sulfur, and a third outlet for a residue of the production flow.

6. The system of claim 1, further comprising a permeation filter configured to allow selective permeation of the hydrogen.

7. The system of claim 1, further comprising a filter configured to remove unreacted hydrogen sulfide.

8. The system of claim 7, wherein the filter comprises porous silicon carbide doped with aluminum or copper.

9. The system of claim 1, wherein the photocatalyst is in form of nanoparticles and is embedded in a cladding of the waveguide.

10. The system of claim 1, wherein the photocatalyst is in form of a thin film and is coated on an outer surface of the waveguide.

11. A method for photocatalytic conversion, comprising:
introducing a production flow from a flowline to a reactor module, wherein the production flow includes hydrogen sulfide and travels in the flowline in a flow direction;
directing a light from a light source to a photocatalyst through a waveguide;
converting the hydrogen sulfide into hydrogen and sulfur using the photocatalyst; and
heating a portion of the reactor module to an elevated temperature, wherein the sulfur is in a liquid phase under the elevated temperature.

12. The method of claim 11, further comprising directing the sulfur in the liquid phase to a sulfur collector through a tubing having a curved portion.

13. The method of claim 12, further comprising controlling a valve disposed at an uppermost point of the curved portion of the tubing.

14. The method of claim 11, further comprising directing the hydrogen to a hydrogen collector.

15. The method of claim 14, further comprising filtering unreacted hydrogen sulfide before the directing the hydrogen to the hydrogen collector.

16. The method of claim 14, further comprising allowing selective permeation of the hydrogen before the directing the hydrogen to the hydrogen collector.

17. The method of claim 14, further comprising directing a residue of the production flow to a gas-oil separation plant.

* * * * *